US012794919B2

(12) United States Patent
Townsend et al.

(10) Patent No.: US 12,794,919 B2
(45) Date of Patent: Nov. 10, 2026

(54) MALWARE DETECTION

(71) Applicant: Bank of America Corporation, Charlotte, NC (US)

(72) Inventors: Joel Richard Townsend, Spring Church, PA (US); John Raymond Omernik, Wittenberg, WI (US); William Anderson Hodges, Mechanicsville, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/781,363

(22) Filed: Jul. 23, 2024

(65) Prior Publication Data

US 2024/0380773 A1 Nov. 14, 2024

Related U.S. Application Data

(63) Continuation of application No. 18/200,689, filed on May 23, 2023, now Pat. No. 12,069,080, which is a continuation of application No. 17/202,968, filed on Mar. 16, 2021, now Pat. No. 11,729,192.

(51) Int. Cl.
*H04L 9/40* (2022.01)
*G06F 16/955* (2019.01)

(52) U.S. Cl.
CPC ........ *H04L 63/1425* (2013.01); *G06F 16/955* (2019.01); *H04L 63/1433* (2013.01); *H04L 63/1466* (2013.01); *H04L 63/1483* (2013.01)

(58) Field of Classification Search
CPC ............. H04L 63/1425; H04L 63/1433; H04L 63/1466; H04L 63/1483; H04L 63/0227; H04L 63/1416; H04L 63/08; H04L 63/0876; H04L 63/1441; H04L 63/168; H04L 67/02; G06F 16/955; G06F 16/958; G06F 21/30; G06F 21/44; G06F 21/57; G06F 21/56
See application file for complete search history.

(56) References Cited

U.S. PATENT DOCUMENTS

| | | | |
|---|---|---|---|
| 7,363,500 | B2 | 4/2008 | Funk |
| 8,117,449 | B2 | 2/2012 | Blythe |
| 8,522,349 | B2 | 8/2013 | Crume |
| 8,533,821 | B2 | 9/2013 | Crume |
| 8,739,243 | B1 | 5/2014 | Martini |

(Continued)

OTHER PUBLICATIONS

Malware Indicator for File Hash; https://oasis-open.github.io/cti-documentation/examples/malware-indicator-for-file-hash.html; article; 5 pages; downloaded Mar. 15, 2021; Cyber Threat Intelligence Technical Committee; Copyright © 2017-2021.

(Continued)

*Primary Examiner* — Brian F Shaw
(74) *Attorney, Agent, or Firm* — Banner & Witcoff, Ltd.

(57) ABSTRACT

Detection and notification of malware at a user device may be performed by a validation server. The user device may hash elements associated with a document object model of a webpage and send generated hash values to the validation server. The validation server may validate the hash values. Based on detection of hash values corresponding to elements maliciously-injected by malware, the validation server may send one or more notifications to other servers that may communicate with the user device.

20 Claims, 8 Drawing Sheets

(56) References Cited

U.S. PATENT DOCUMENTS

| | | | | |
|---|---|---|---|---|
| 8,869,259 | B1 | 10/2014 | Udupa et al. | |
| 8,917,826 | B2 | 12/2014 | Bravo et al. | |
| 8,943,588 | B1 | 1/2015 | Speegle et al. | |
| 9,160,718 | B2 | 10/2015 | Martini | |
| 9,294,450 | B2 | 3/2016 | Martini | |
| 9,602,531 | B1 | 3/2017 | Wallace et al. | |
| 10,341,357 | B2 | 7/2019 | Martini | |
| 10,362,043 | B2 | 7/2019 | Wu et al. | |
| 10,715,547 | B2 | 7/2020 | Edwards et al. | |
| 10,884,907 | B1 | 1/2021 | Zhao et al. | |
| 11,062,019 | B2 | 7/2021 | Yaffe et al. | |
| 2014/0259158 | A1 | 9/2014 | Brown et al. | |
| 2015/0237038 | A1* | 8/2015 | Grajek | G06F 21/64 726/8 |
| 2015/0341385 | A1 | 11/2015 | Sivan et al. | |
| 2018/0288060 | A1* | 10/2018 | Jackson | H04L 63/107 |
| 2019/0377877 | A1 | 12/2019 | Johns | |
| 2020/0195682 | A1 | 6/2020 | Chervoni et al. | |
| 2021/0176273 | A1 | 6/2021 | Hales et al. | |
| 2021/0406370 | A1 | 12/2021 | Disney et al. | |
| 2023/0102116 | A1* | 3/2023 | Chen | H04L 63/126 726/25 |

OTHER PUBLICATIONS

Roccia; Fifty Shades of Malware Hashing; https://medium.com/malware-buddy/fifty-shades-of-malware-hashing-3783d98df59c; article; Sep. 29, 2019; 9 pages.

Donohue; The Wonders of Hashing; https://usa.kaspersky.com/blog/the-wonders-of-hashing/3595/; Blog; Apr. 10, 2014, 10 pages.

Liu et al, JSDC: A Hybrid Approach for JavaScript Malware Detection and Classification; https://www.researchgate.net/publication/283098369; Article; Apr. 2015; 13 pages.

What is a Hash? (And How Does It Work?); Blog; https://www.sentinelone.com/blog/what-is-hash-how-does-it-work/; 8 pages; May 22, 2019; SentinelOne.

* cited by examiner

MALWARE DETECTION

CROSS-REFERENCE TO RELATED APPLICATIONS

This application is a continuation of U.S. patent application Ser. No. 18/200,689, filed on May 23, 2023, which is a continuation of U.S. patent application Ser. No. 17/202,968, filed on Mar. 16, 2021, issued as U.S. Pat. No. 11,729,192 on Aug. 15, 2023, which are hereby incorporated by reference in their entirety.

TECHNICAL FIELDS

Aspects described herein generally relate to detection of malicious applications operating on a computer, and more specifically to detection of maliciously-injected code compromising communications with a server.

BACKGROUND

Communications (e.g., web browser communications) associated with a variety of endpoint computing devices (e.g., personal computing devices, mobile phones, tablets, and the like) may be vulnerable to unauthorized exposure. These communications may be compromised via malicious applications operating on the endpoint computing device itself, as well as via compromised computing devices running malicious software that access networked devices operating between the endpoint computing devices and server devices. The malicious applications (e.g., malware) may, for example, facilitate "man-in-the-middle" interception of communications, where a third party computing device may operate as a proxy to monitor and/or modify communications between the endpoint computing devices and server devices without user consent. As such, a user of a compromised endpoint computing device may expose a user's private and/or sensitive information (e.g., login credentials, security keys, and the like) to a third party during networked communications, such as when communicating with a server device via a web browser.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting malware that may be used for interception of web browser communications and preventing exposure of sensitive information via a web browser.

In accordance with one or more arrangements, a system may comprise a web server configured to send a webpage document, wherein the webpage document comprises a script element indicating a client-side script. The system may further comprise a user device with at least one first processor and memory storing first computer-readable instructions that, when executed by the at least one first processor, cause the user device to receive, from the web server, the webpage document. The user device may parse, via a web browser, a webpage, wherein the parsing the webpage may be based on a document object model (DOM) comprising a plurality of elements. The plurality of elements may comprise hypertext markup language (HTML) elements based on the webpage document and the one or more elements injected by the malware. The user device may retrieve, based on the script element and from a validation server, the client-side script. The user device may generate, based on the client-side script, for each element of the plurality of elements, a corresponding hash value. The user device may send, to the validation server, generated hash values corresponding to the plurality of elements. The validation server may determine that one or more hash values of the one or more elements injected by malware correspond to one or more hash values stored in a hash repository. Based on the determining, the validation server may send one or more notifications to one or more computing devices In some arrangements, the validation server may send, to the user device and based on the determining that the one or more hash values of the one or more elements injected by malware correspond to the one or more hash values stored in the hash repository, a request for at least the one or more elements. The user device may send, based on receiving the request and to the validation server, the one or more elements. The user device may send the one or more elements based on executing the client-side script.

In some arrangements, the user device may send, to the validation server, additional information, wherein the additional information may comprise one of: a session indicator (ID) associated with a web session between the user device and the web server; a uniform resource locator (URL) associated with the webpage; an internet protocol (IP) address associated with the user device; a username, associated with the webpage, of a user of the user device; text included in the webpage; and combinations thereof.

In some arrangements, the validation server may be configured to determine, based on the additional information, a risk score associated with the webpage.

In some arrangements, the one or more computing devices may comprise the web server. Based on receiving a notification, the web server may terminate a web session with to the user device.

In some arrangements, the script element may comprise a uniform resource locator (URL) corresponding to the client-side script. The user device may retrieve the client-side script based on the URL.

In accordance with one or more arrangements, a validation server may receive, from a user device, hash values of a plurality of elements corresponding to a document object model (DOM) of a webpage presented at the user device. The validation server may determine that one or more hash values of one or more elements of the plurality of elements correspond to one or more hash values stored in a hash repository. Based on the determining, the validation nserver may send a notification to a web server associated with the webpage.

In some arrangements, the validation server may send, to the user device and based on the determining, a request for the one or more elements. The validation server may receive, from the user device, the one or more elements.

In some arrangements, the validation server may send, to the user device, a client-side script. The client-side script may be configured to generate and send the hash values of the plurality of elements.

In some arrangements, the notification may comprise one of: a session indicator (ID) associated with a web session between the user device and the web server; an internet protocol (IP) address associated with the user device; a username, associated with the webpage, of a user of the user device; and combinations thereof.

In some arrangements, the validation server may receive, from the user device, additional information. The additional information comprises one of: a session indicator (ID) associated with a web session between the user device and the web server; a uniform resource locator associated with the webpage; an internet protocol (IP) associated with the user device; a username, as associated with the webpage, of a user of the user device; text included in the webpage; and combinations thereof.

In some arrangements, the validation server may determine, based on the additional information, a risk score associated with the webpage.

In some arrangements, the sending the notification to the web server may comprise sending the notification based on determining that the risk score is greater than a threshold risk score.

In some arrangements, the validation server may, based on the determining, send a second notification to another server associated with backend services facilitated by the webpage. The another server may correspond to a wire transfer service.

In accordance with one or more arrangements, a validation server may comprise at least one processor; a communication interface communicatively coupled to the at least one processor; and memory storing computer-readable instructions. The computer-readable instructions, when executed by the at least one processor, may cause the validation server to receive, from a user device, hash values of a plurality of elements corresponding to a document object model (DOM) of a webpage presented at the user device. The validation server may determine that one or more hash values of one or more elements of the plurality of elements correspond to one or more hash values stored in a hash repository. Based on the determining, the validation server may send a notification to a web server associated with the webpage.

In some arrangements, the validation server may send, to the user device and based on the determining, a request for the at least one or more elements. The validation server may receive, from the user device, the at least one or more elements. In some arrangements, the notification may indicate that the web server is to terminate a web session with the user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
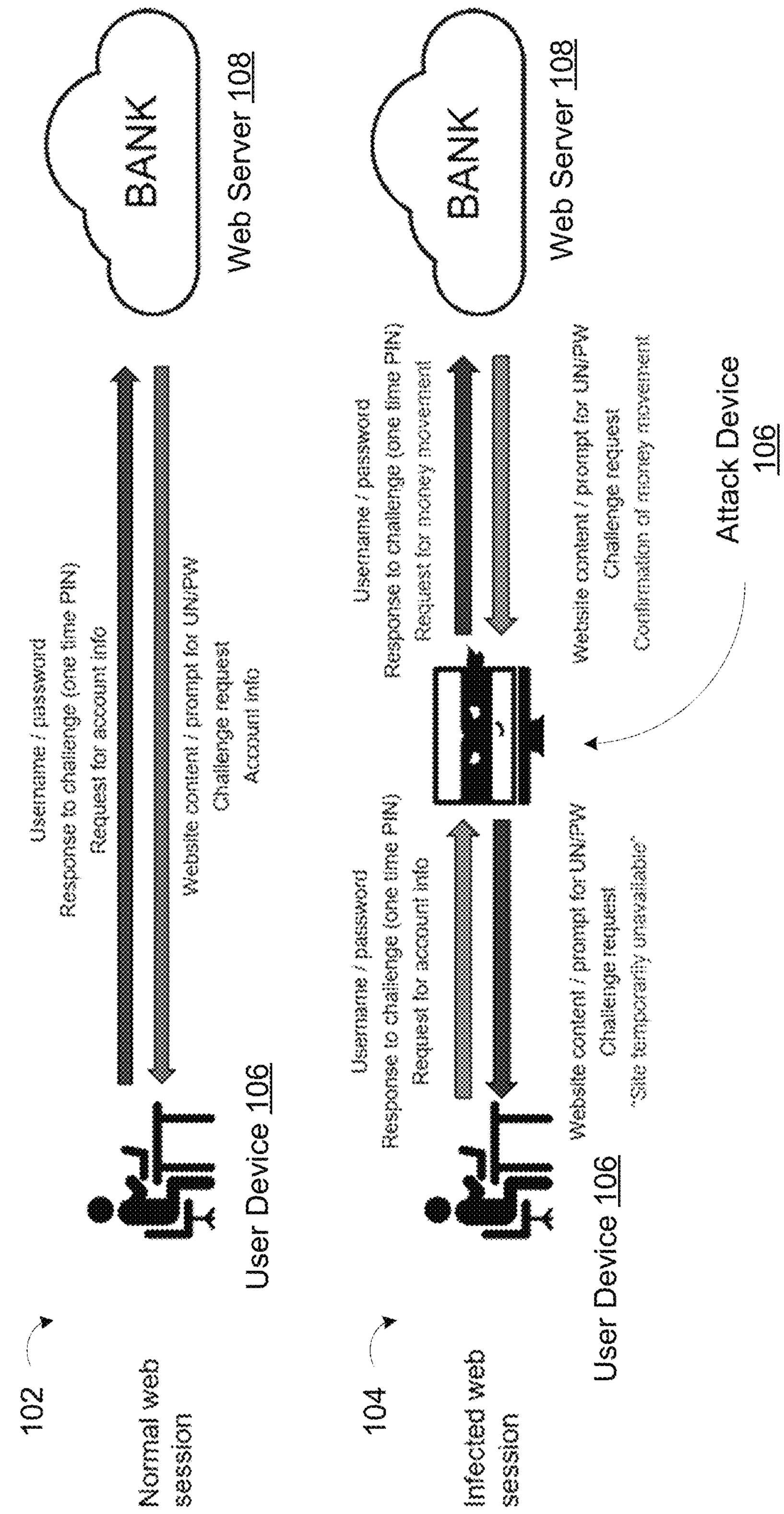
FIG. 1 (Prior art)
FIG. 1 shows a comparison between a normal web session and an infected web session compromised by an man in the middle (MITM) attack vector, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect. The examples and arrangements described are merely some example arrangements in which the systems described herein may be used. Various other arrangements employing aspects described herein may be used without departing from the invention.

Malicious applications, such as malwares, may operate to intercept, monitor, and/or otherwise control communications from one or more computing devices (e.g., endpoint computing devices, server computing devices, and the like). These communications may include client-server communications, such as those between endpoint computing devices (e.g., personal computing devices, mobile phones, tablets, and the like) and provider computing devices (e.g., server computing devices) via a network (e.g., a local area network, a wide area network, and the like). A malware may operate on and/or access an endpoint device, a provider device, and/or an intermediate network device (e.g., a transport device, a router device, and the like) to intercept or otherwise monitor communications and to steal sensitive and/or private information without user and/or provider consent.

Malware may be used to facilitate man-in-the middle (MITM) attacks, enabling an attacker to gain access to user credentials associated with a web server. Malware may allow code to be injected into a web browser that may intercept communications (e.g., comprising access credentials, such as usernames, passwords) between a user computing device and the web server, and send the intercepts to a malicious computer. Even web services that implement multi-factor authentication (e.g., using one-time passcode (OTP)) may be susceptible to MITM attacks. Malware may direct user traffic to a malicious server that may present a fraudulent webpage, mimicking an authentic webpage associated with the web server. A user-input OTP via the fraudulent webpage may be then be used by an attacker to access a user profile associated with a website.

Detection of malware (and other security threats) often involve the use of dedicated security applications that may scan a user device. For example, a security application may detect malware using a database that contains "definitions" associated with different types of malware. Since malicious applications are constantly being created and/or updated, the database may constantly need to be updated at the user device. Further, executing the security application at the user device may use significant computing resources. Various examples described herein describe a validation server that may be used for threat detection at a user device. Threat detection may be based on hashing of code elements (e.g., associated with a webpage) and sending the hashes to the validation server for review. Using hashes for detection of malicious code may enable quick detection of threats (without requiring analysis of entire code elements). Further, the validation server may be enabled to directly communicate with other servers (e.g., web servers, backend services servers, etc.) that may be associated with the user device. For example, the validation server may alert other servers to indicate that the user device may be compromised and that a connection with the user device may be terminated.

FIG. 1 shows a comparison between a normal web session 102 and an infected web session 104 compromised by an MITM attack vector. FIG. 1 relates to a user attempting to access a bank service (e.g., facilitated by a web server 108) via a user device 106. However, the example shown in FIG. 1 may hold true for any other type of authenticated services.

The bank service may use two-factor authentication requiring user credentials (e.g., a username and a password) as well as an OTP. In the normal web session 102, the user may access a bank website (e.g., via a web browser, or a bank application) which may prompt the user to input first credentials (e.g., a username and a password). The input first credentials may be sent to the web server 108. The web server 108 may authenticate the first credentials and cause sending of an OTP (e.g., to an email address associated with the user, or to another user device, such as a cell phone). Further, the web server 108 may send a "challenge request" to the user device, requesting the user to input the OTP. The user may input the OTP via the user device 106 on the bank website, which may be sent to the web server 108. The web server 108 may authenticate the OTP and, based on the authentication, enable the user to gain access to various backend services associated with the banking systems (e.g., account inquiry, money transfers, etc.).

In an infected web session 104, the user device 106 may be infected by a malware that may route at least some of the traffic between the user device 106 and the web server 108 to an attack device 106 associated with the MITM attack. For example, the malware may insert code into the web browser being used by the user to facilitate the MITM attack. The MITM attack may be supported by malware-installed keylogging software and/or code that may redirect the user to a fake website. The inserted code may send the first credentials (e.g., captured using keylogging software) to the attack device. The inserted code may then redirect the web browser to the fake website, mimicking the bank website, with a prompt for the user to input the OTP. The input OTP may be forwarded to the attack device 106. The attack device 106 may use the OTP to gain access to the user account. Once the attacker gains access to the user account, the attacker may then initiate fraudulent outgoing transfers from the user account. The malware may also present an error notification (e.g., "site temporarily unavailable") to the user to delay discovery of the fraudulent activity. The first credentials, now having been captured, may be used repeatedly by the attacker for other nefarious purposes.

Various examples described herein enable analysis of objects/elements associated with a document object model (DOM) corresponding to a webpage to determine malicious code that may have been injected. A DOM representation of a webpage document may comprise various objects/elements (e.g., image files, scripting files, script tags, inline frames, etc.) that may be used to render and/or manipulate a webpage by the web browser (e.g., using JavaScript). A client-side script operating on a user computer may generate hashes associated with the various elements of the DOM and send them to a validation server for analysis. The validation server may detect any malicious elements (e.g., which may be malicious code inserted into the web browser by malware) based on the generated hashes. The validation server may communicate with other services in the network to facilitate implementations of any protective actions to protect an end user.

Figure 2:
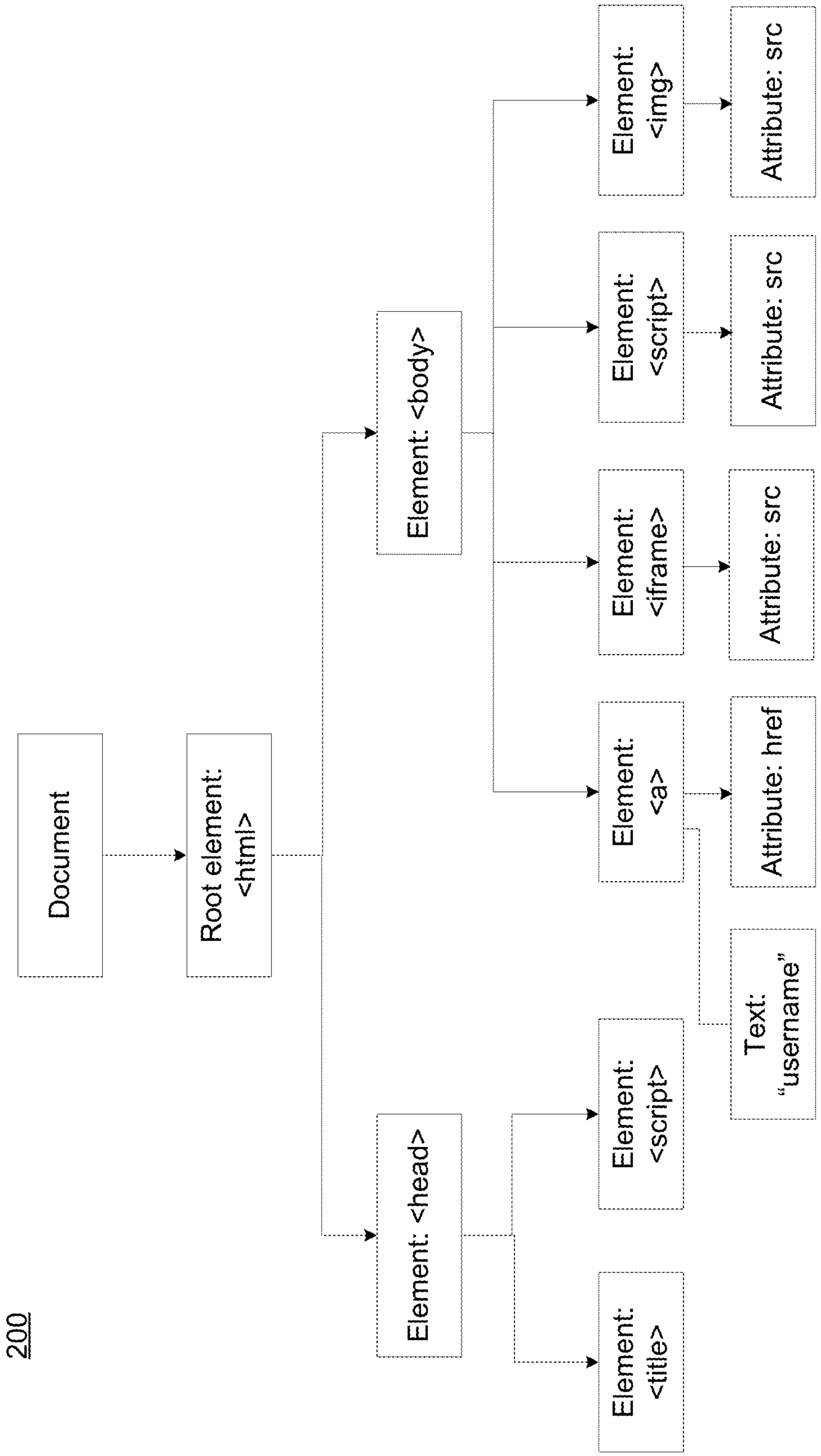
FIG. 2 shows an example document object model (DOM) corresponding to a webpage, in accordance with one or more aspects described herein.

FIG. 2 shows an example DOM 200 corresponding to a webpage. The DOM 200 may correspond to an HTML document associated with the webpage. The HTML document may be accessed by the web browser when a user navigates to the webpage by inputting a uniform resource locator (URL) corresponding to the webpage. The HTML document may be downloaded into local memory for rendering in the web browser. Each node of the DOM 202 corresponds to a part of the HTML document. The DOM 202 may comprise multiple elements, each associated with different tags (e.g., <head>, <body>, <title>, <script>, <iframe>, <a>, <img>, etc.). For example, a script tag <script> may be used to embed a client-side script file (e.g., a JavaScript file) to be executed at the user device. An inline frame tag <iframe> tag may be used to embed another document in the HTML document. An image tag <img> may be used to embed an image in the webpage, etc.

Each of the elements/tags may be associated with corresponding one or more attributes. For example, an "src" attribute may be used to embed a URL for a particular element corresponding to a tag. The user device may use the URL to access a particular resource to be used for rendering the webpage. The client-side script file associated with the script tag, for example, may be indicated using an "src" attribute. The "src" attribute may indicate a URL corresponding to the client-side script file and the user device may download and execute the client-side script based on the indicated URL. Similarly, an "src" attribute may be used to indicate a URL for an image file associated with an image tag. An "src" attribute may be used to indicate a URL for an HTML document associated with an inline frame tag.

Figure 3:
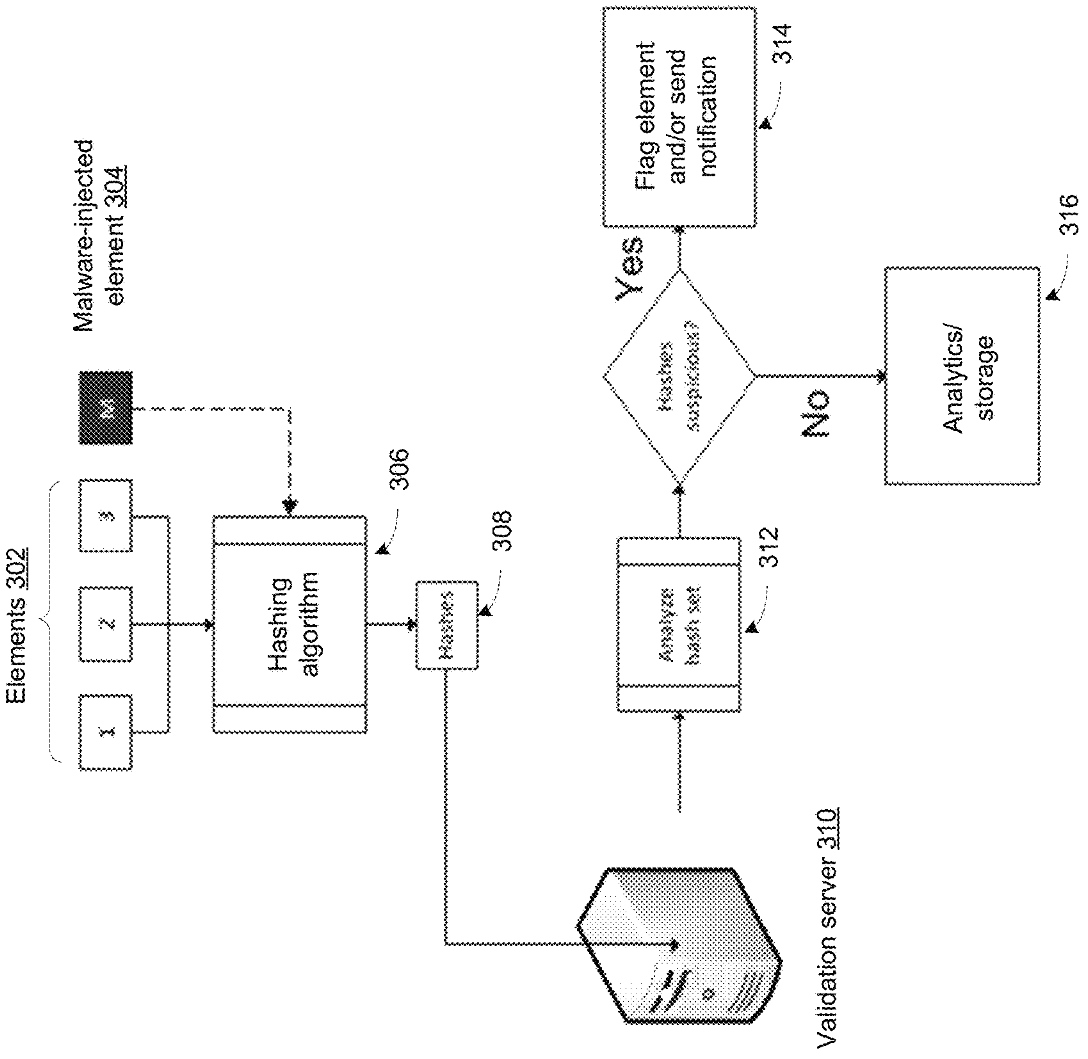
FIG. 3 shows an example procedure for analyzing elements associated with a webpage, in accordance with one or more aspects described herein.

FIG. 3 shows an example procedure for analyzing elements associated with a webpage as being rendered at a user device by a web browser. Elements 302 (e.g., comprising elements 1, 2, and 3) correspond to a DOM representation of the webpage. The elements 302 may be based on an HTML document associated with the webpage and as received from a web server. For example, each of the elements may be associated with different tags of the HTML document, as described with reference to FIG. 2. The elements 302 may comprise tags associated with client-side scripts, images, inline frames, etc. The elements 302 may be used at a user device to render the webpage by the web browser.

The web browser may be infected by a malicious element M 304, injected by malware. The malicious element M 304, for example, may be injected into the DOM corresponding to the webpage. The malicious element M 304 may compromise communications between the browser and the web server, enabling various attack vectors (e.g., such as a MITM attack as described with reference to FIG. 1). The malicious element M 304 may comprise, for example, a malicious script file and/or a URL where the malicious script file may be stored (e.g., at a malicious web server). The web browser, based on the URL, may retrieve the malicious script file and execute it at the user device.

The HTML document may comprise an element (e.g., comprising a <script> tag) indicating a URL for a client-side script file (e.g., a hashing script file). In an example, the client-side script file may be stored at a validation server 310. Based on the URL, the user device may download (e.g., from the validation server 310) and execute the client-side script file. The client-side script file, at the user device, may comprise a hashing algorithm 306 to analyze the elements 302 and the malicious code 304. The client-side script file may comprise a hashing algorithm 306 for generating a hash set corresponding to all elements. The hash set may comprise hash values for each of the elements 302 and the malicious code 304. For example, the hashing algorithm 306 may hash: element 1 to generate hash value 1, element 3 to generate hash value 3, element 3 to generate hash value 3, and element M to generate hash M. As further described herein, a validation server 310 may analyze the generated hashes to determine if the DOM comprises any malicious element.

The hashing algorithm 306 may use any appropriate hash function to generate the hash values. For example, the hashing algorithm may use fuzzy hashing. In fuzzy hashing, an element to be hashed may be divided into blocks and each of the blocks may be hashed. These hashed blocks may then be compared with stored hashes (e.g., as further described with respect to operation of the validation server 310) to determine a match. The match need not be exact (e.g., not all hashed blocks of an element need to match). Fuzzy hashing may be beneficial because malware developers may constantly update their code to evade detection and fuzzy hashing does not require an exact match between all hash blocks for determining a match. The hashing algorithm 306 may use one or more types of hashing functions (e.g., cyclic redundancy checks (CRC), checksums, etc.) to generate the hash values/hashed blocks.

Attributes of an element corresponding to a webpage may vary between different users. For example, attributes corresponding to a username, a user profile, user preferences associated with how the webpage is to be displayed, etc., may vary. If the element is directly hashed, different user devices may generate different hash outputs for a same element based on the hashing algorithm 306. To alleviate this variation between different user devices, the hashing algorithm 306 may, prior to hashing, parse an element to remove content (e.g., attributes) that may be personalized for a specific user. For example, consider an example where element 1 comprises text displaying a username for a user associated with the user device and element 3 may indicate a script file that translates the webpage content associated with the webpage to a user-specified language. Both elements 1 and elements 3 may therefore comprise attributes that vary between users. The hashing algorithm 306 may parse out the portions of the elements that may vary between users prior to hashing the elements. For example, with reference to element 1, the hashing algorithm may remove the username associated with the user. With reference to element 3, the hashing algorithm may remove the script file that translates the webpage content to a user-specified language.

The client-side script file may cause sending the hash set (e.g., comprising the generated hash values), from the user device, to a validation server 310. At step 312, the validation server 310 may analyze the hash values using a database of hash values to determine whether the hash values correspond to trusted elements. For example, the validation server 310 may use a hash repository with hash values that correspond to (i) trusted elements as may be used in HTML documents and/or (ii) malicious elements that are known to correspond to malware-injected code. If a hash value in the hash set matches a hash value in the hash repository that corresponds to a trusted element, the validation server 310 may determine that the element corresponding to the hash value in the hash set is trusted. As further described herein, the validation server may use other techniques to determine if the hash value corresponds to a trusted element. If a hash value is determined to correspond to a trusted element, the hash value may be stored in an analytics/storage server (e.g., step 316) or the hash repository and used for analyzing future received hashes.

If a hash value in the hash set matches a hash value in the hash repository that corresponds to a malicious element, the validation server 310 may determine that the element corresponding to the hash value in the hash set is malicious. Malicious elements may be flagged (e.g., step 314) for further review (e.g., by an administrative user associated with the validation server 310). Detection of malicious elements may cause sending of one or more notifications to other servers (e.g., associated with backend services) that may communicate with the web server and/or the user device.

For example, the validation server 310 may determine that hash values 1, 2, and 3 correspond to trusted elements of the HTML document based on determining a match between the hash values 1, 2, 3 and stored hash values corresponding to trusted elements. The validation server 310 may determine that the hash value M corresponds to malware-injected code based on determining a match between the hash value M and a stored hash value corresponding to a malicious element.

If a hash value in the hash set does not match with any hash value in the hash repository, the hash value may be flagged for further review (e.g., by an administrative user associated with the validation server 310) to determine whether an element corresponding to the hash value is malicious. For example, the validation server 310 may request the element and/or all elements of the DOM to be sent to the validation server 310 for further review in order to determine whether the element is malicious. An administrative user associated with the validation server 310 may manually review the element(s) to determine whether an element corresponds to code injected by malware.

If fuzzy hashing is used by the hashing algorithm 306, a single element may comprise multiple hashed blocks. The validation server 310 may compare the hashed blocks with hashes stored in the hash repository to determine if hashed blocks correspond to malicious or trusted elements. For example, if a threshold quantity of hashed blocks of an element match hash blocks corresponding to a malicious element, the element may be determined to be malicious.

As another example, the validation server 310 may use a hash repository with hash values that correspond to malicious elements that are known to correspond to malware-injected code. If a hash value in the hash set matches a hash value in the hash repository, the validation server 310 may determine that the element corresponding to the hash value in the hash set is malicious. If a hash value in the hash set does not matches a hash value in the hash repository, the validation server 310 may determine that the element corresponding to the hash value in the hash set is not malicious.

For example, the validation server 310 may determine that hash values 1, 3, and 3 correspond to trusted elements of the HTML document based on determining the hash values 1, 3, 3 do not correspond to hash values in the hash repository. The validation server 310 may determine the hash value M to correspond to malware-injected code based on determining a match between the hash value M and a stored hash value in the hash repository.

The validation server 310 may indicate detection of malicious elements to other servers that may be associated with services provided by the webpage. For example, the webpage may be associated with a wire-transfer service via which the user may transfer a sum of money from a user account to a destination account. Based on detection of a malicious element in the webpage, the validation server 310 may send a notification to a server associated with the wire transfer service flagging a wire transfer request from the user device as potentially fraudulent. The server associated with the wire transfer service may block the wire transfer request based on the notification.

As another example, the webpage page may be a gateway via which the user may input credentials to access a particular service associated with the webpage. Based on detection of a fraudulent element within the webpage (e.g., a script corresponding to keylogging code), the validation server 310 may send a notification to the web server, which may cause the web server to deny authorization of the credentials. The web server may, for example, terminate a web session with the user device. As further described herein, countermeasures to be used, based on detection of malicious elements, may be based on a risk score as may be generated by the validation server 310.

Figure 4:
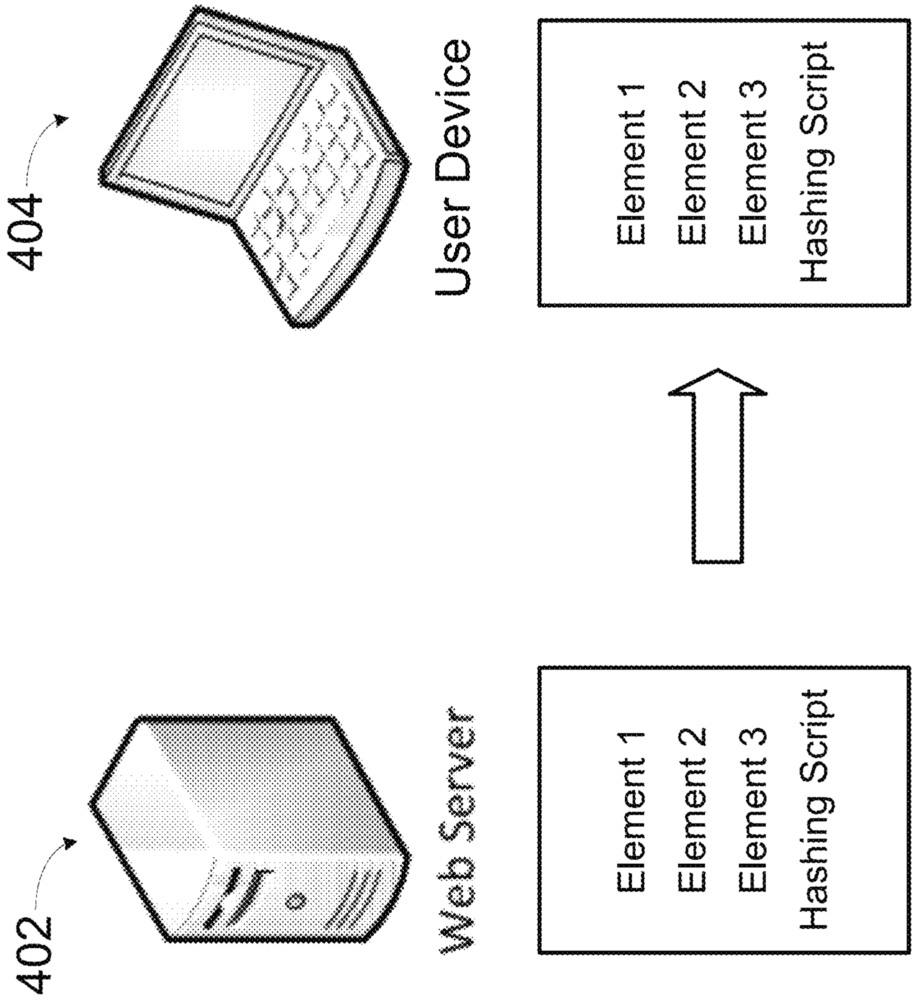
FIG. 4 shows an example communication between a web server and a user device for presentation of a webpage at the user device, in accordance with one or more aspects described herein.

FIG. 4 shows an example communication between a web server 402 and a user device 404 for presentation of a webpage at the user device 404. The user device 404 may send, based on a URL input via a web browser, a request for a webpage from the web server 402. The web server 402 may send, to the user device 404 and based on the request, a plurality of elements (e.g., elements 1, 2, 3) associated with the webpage. The web server 402 may further send an element comprising/indicating a hashing script to the user device. The plurality of elements and the element comprising/indicating the hashing script may correspond to a DOM of an HTML document corresponding to the webpage. The hashing script may be used to generate the hash values of all elements that may be used to render the webpage by the web browser. The elements used to render the webpage may comprise the plurality of elements sent by the web server 402, as well as any elements corresponding to extensions associated with the browser and maliciously-injected elements (if any).

Figure 5A:
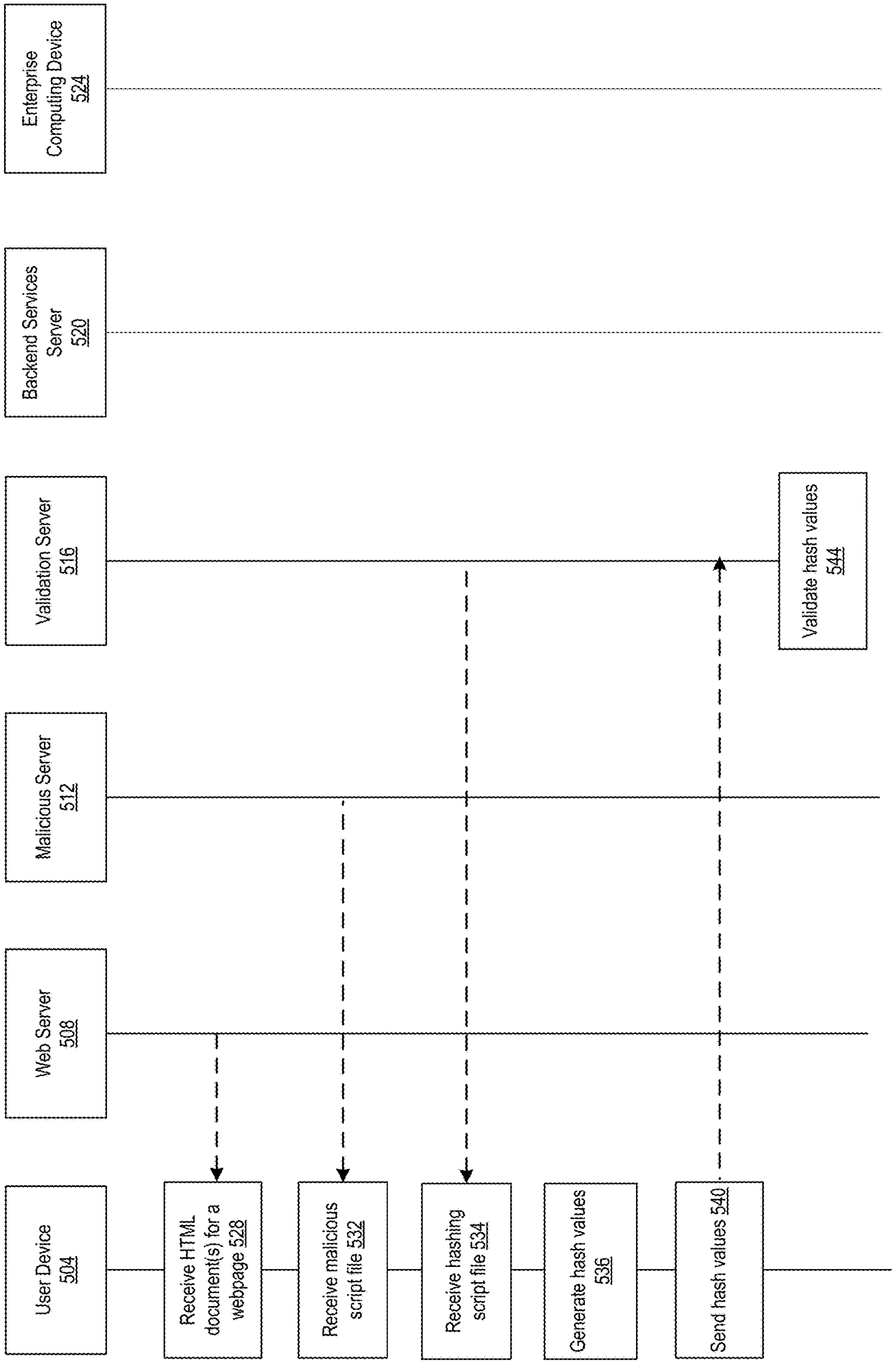
FIGS. 5A and 5B show an example event sequence for analyzing elements associated with a DOM corresponding to a webpage, in accordance with one or more aspects described herein.
Figure 5B:
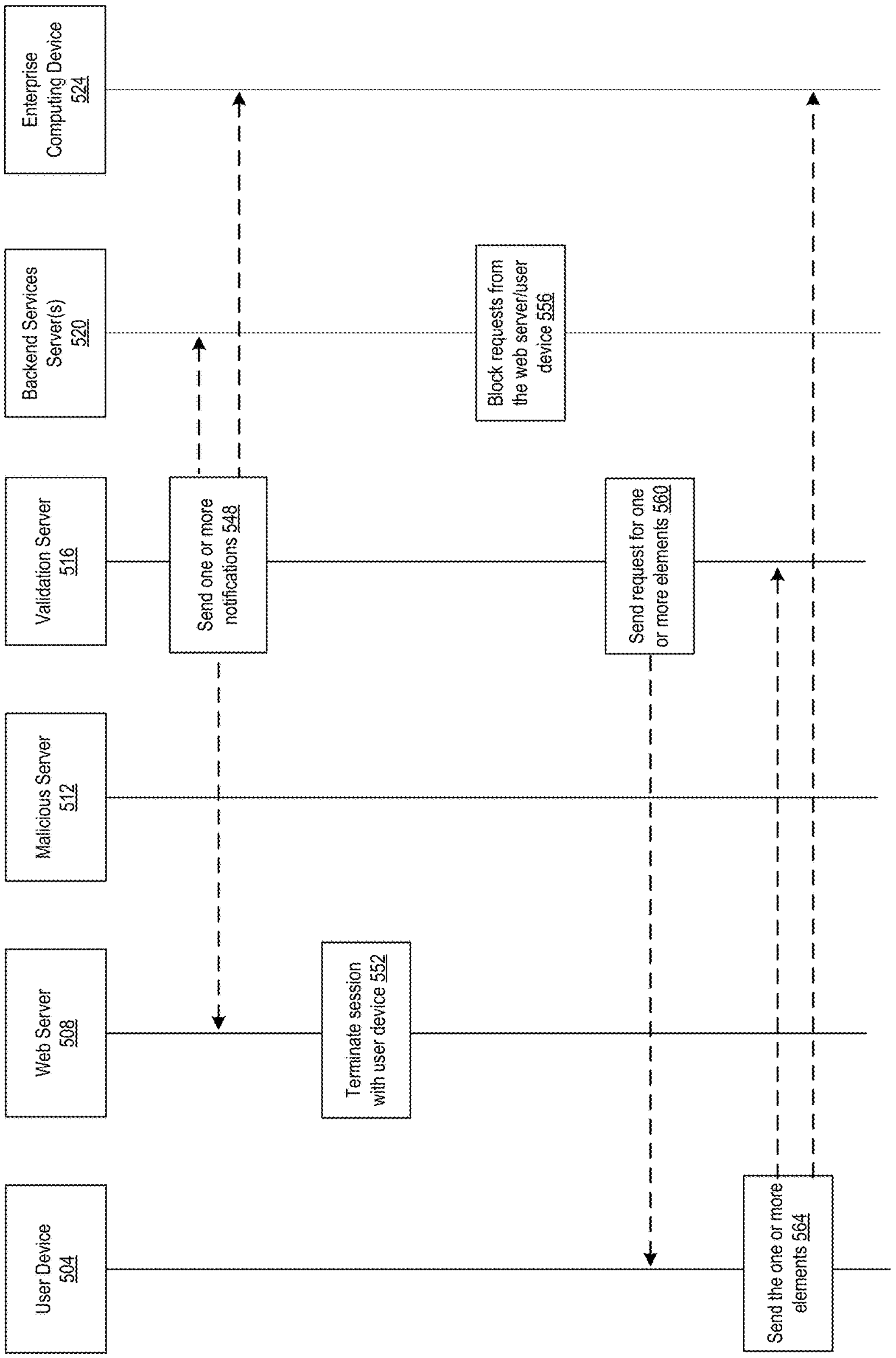

FIGS. 5A and 5B show an example event sequence for analyzing elements associated with a DOM corresponding to a webpage. A user, associated with a user device 504, may access a webpage via a web browser. The webpage may be accessed, for example, using a URL associated with the webpage. At step 528, the user device 504 may receive, from a web server 508 associated with the webpage, an HTML document corresponding to the webpage. The HTML document may comprise one or more elements of a DOM. The web browser may generate the webpage for display at the user device 504 based on the one or more elements.

The user device may be infected by a malware application which may cause injection of a malicious element in the DOM associated with the webpage. The malicious element may, for example, comprise an attribute (e.g., "src") indicating a script file (e.g., a malicious script file associated with an attacker). The malicious element, when processed by the web browser, may cause the user device 504 to retrieve, from a malicious server 512, the malicious script file (e.g., step 532).

The malicious script file may comprise code that, when executed by the web browser, may compromise communications between the user device 504 and the web server 508. The malicious script file may facilitate attacks via one or more attack vectors. For example, communications between the user device 504 and the web server 508 may be redirected to another device executing an MITM attack (e.g., as described with reference to FIG. 1). The malicious script file may comprise a keylogger that may determine credentials input (e.g., via a keyboard, keypad) at the user device 504 and send them to a device associated with an attacker. The malicious script file may comprise a screen capturing code that may copy a displayed screen at the user device 504 and send them to a device associated with an attacker. The malicious script file may facilitate presentation of a fake webpage (e.g., mimicking the appearance of an authentic/trusted webpage) that may prompt the user to input an OTP.

At least one element, of one or more elements of the webpage, may comprise an attribute (e.g., "src") indicating a client-side script file (e.g., a hashing script). The at least one element, when processed by the web browser, may cause the user device 504 to retrieve (e.g., from a validation server 512) the hashing script (e.g., step 534).

At step 536, the web browser may execute the hashing script. The hashing script may generate hash values corresponding to each of the one or more elements corresponding to the DOM. For example, the hashing script may use fuzzy hashing to generate hashed blocks corresponding to an element of the one or more elements. The hashing script may use one or more types of hashing functions (e.g., cyclic redundancy checks (CRC), checksums, etc.) to generate the hash values. Generating the hash values may comprise parsing the elements to remove one or more attributes that may be user-specific for a user associated with the user device 504 (e.g., as described with reference to FIG. 3).

At step 540, the user device 504 may send the generated hash values to the validation server 516. For example, the hashing script, when executed by the web browser, may cause the user device 504 to send the generated hash values to the validation server 516. The user device 504 may send other information associated with the user device 504 (e.g., internet protocol (IP) address), or a connection between the user device 504 and the web server 508 (e.g., session identifier (ID), username associated with the user, date, time, etc.). The user device 504 may send, to the validation server, properties associated with the webpage (e.g., action being initiated by the webpage, a name of the webpage, text associated with the webpage, webpage URL, etc.). For example, a webpage may include the text corresponding to one or more elements (e.g., indicated by a <p> tag, <h1> tag, etc.). The hashing script may scan the text to determine specific text that may be sent to the validation server 516. For example, the user device may determine the text "wire transfer," "account transfer," "transfer value," "confirm purchase," etc. in the webpage and send the text to the validation server 516. The hashing script may comprise a set of terms to be scanned for in the DOM. As further described herein, the validation server 516 may use the other information to determine a risk score associated with the webpage.

At step 544, the validation server 516 may analyze hash values to determine whether the hash values correspond to one or more malicious elements. For example, the validation server 516 may comprise and/or communicate with a repository storing hash values known to correspond to malicious elements. Based on a received hash value matching a stored hash value, corresponding to a malicious element, the validation server 516 may determine that an element corresponding to the received hash value may be malicious. Additionally, or alternatively, the hash repository may comprise hash values that are known to correspond to trusted elements of the webpage. Based on a received hash value matching a stored hash value, corresponding to a trusted element, the validation server 516 may determine that an element corresponding to the received hash value is trusted. If the validation server 516 is unable to categorize an element as malicious or trusted, the validation server may determine that the hash value is indeterminate. The validation server 516 may store indeterminate hash values for further review (e.g., by an administrative user).

If the hashing script uses fuzzy hashing at the user device, the validation server 516 may analyze hashed blocks corresponding to an element. The validation server 516 may compare the hashed blocks with one or more hash values (e.g., in the hash repository) to determine whether the hashed blocks correspond to a malicious element. If a threshold number of hashed blocks match hash values corresponding to a malicious element, the validation server 516 may determine that the element is malicious. Fuzzy hashing may be beneficial because attackers may consistently update the malicious elements. Using an exact match between a received hashed value and a stored hash value may not necessarily detect a malicious element, if the malicious element has been updated but the stored hash value corresponds to a previous version of the malicious element. Fuzzy hashing may enable detection of newer versions of malicious elements based on hashed values corresponding to older versions.

Additionally, or alternatively, the validation server 516 may use a machine learning algorithm to identify hash values corresponding to malicious elements. The validation server 516 may comprise a machine learning engine that may be trained to identify hash values corresponding to malicious elements. For example, the machine learning engine may be trained based on hash values corresponding to known malicious elements.

The validation server 516 may use other metrics to determine whether a hash value corresponds to a malicious element. The validation server 516 may track hash values received from multiple user devices. If a large proportion of user devices (e.g., >50%) are showing a hash value, the validation server 516 may determine that the hash value may correspond to a trusted element. If a smaller proportion of user devices (e.g., <10%) are showing a hash value, the validation server 516 may determine that the hash value may correspond to a malicious element. If a unique hash value is received from a user device, it may be an indication of a test code released by a malicious actor. The validation server 516 may send the hash value to the enterprise computing device 524 for analysis. In this manner, potential malware may be detected before it may be deployed on a large scale.

At step 548, the validation server 516 may send notification(s) to one or more other devices (e.g., servers) based on hash value(s), of one or more elements of the DOM, corresponding to malicious elements and/or being indeterminate. For example, the validation server 508 may send notifications to the web server 508, servers (e.g., backend services server(s) 520) associated with backend services that may interact with the web server 520/user device 504, and/or a computing device (e.g., an enterprise computing device 524) associated with the validation server 516. The notifications may indicate that one or more elements of the DOM may correspond to malicious elements and/or are indeterminate. The notifications may indicate hash value(s) of the malicious elements and/or hash value(s) that are indeterminate. The notifications may comprise other information. For example, the notifications may comprise information associated with a web connection between the user device 504 and the web server 508 (e.g., a session ID, a webpage URL, a username associated with a user of the user device 504, IP address of the user device 504, etc.).

The sending of the notifications may be based on a risk score associated with the webpage in which a malicious element has been detected. The validation server 516 may determine the risk score based on detection of a malicious element in the DOM of the webpage. The validation server 516 may determine a risk score based on other information associated with the webpage (e.g., as sent by the user device 504 and as described with reference to step 540). The validation server 516 may send the notifications based on determining that the webpage is associated with a high risk score. The validation server 516 may flag a hash value of an element (or a DOM/website corresponding to the element) for further review if the risk score of a webpage comprising the element is determined to be low. For example, the validation server may send the hash value/element (or the DOM) to the enterprise computing device 524 for further review.

A risk score may be determined based on a type of the webpage. The type of the webpage may be determined based on a name associated with webpage, a session ID, text included in the webpage, webpage URL, etc. Consider an example where the webpage may be associated with a banking or financial institution (e.g., providing money transfer services and/or other banking services). If the webpage is determined to be associated with a request for a wire transfer (e.g., which may be instantaneous and/or correspond to a high transfer value), a higher risk score may be assigned to the webpage. The validation server 540 may determine that the webpage is associated with a wire transfer request based on the webpage including the text “wire transfer” and/or based on a URL being associated with a website that processes wire transfers. Conversely, if the webpage is associated with a regular account transfer (e.g., which may use an automatic clearing house (ACH) network), a lower risk score may be assigned to the webpage.

If the webpage is associated with a transfer facility that has high transfer limits (e.g., greater than $10,000), a higher risk score may be assigned to the webpage. If the webpage is associated with a transfer facility that has low transfer limits (e.g., lower than $1,000), a lower risk score may be assigned to the webpage. The validation server 540 may determine transfer limits associated with the webpage based on a session ID.

The validation server 516 may determine a risk score based on a profile associated with the user. A user profile may be determined based on a username associated with the user, IP address of the user device 504, name of the user, etc. If a user corresponding to the user device 504 is determined is a high value client or has a high account balance (e.g., based on the user profile), a higher risk score may be assigned to the webpage.

The validation server 516 may determine a risk score based on detection of a hash corresponding to an element injected by a particular malware. For example, if detected element corresponds to a malware that is determined to be currently highly active (e.g., a quantity of user devices inflicted with the malware is greater than a threshold), a higher risk score may be assigned to the webpage.

A backend services server 520 may correspond to a wire transfer service that may be used to initiate an outgoing payment from a bank account associated with a user. For example, the web server 508 may correspond to banking or a financial institution that may present a webpage, at the user device 504, for requesting a wire transfer. Based on user input via the webpage, the web server 508 may send a notification for processing a wire transfer to the backend services server 520. The validation server 516 may send notification(s) to the backend services server 520 and/or the web server 508 based on the validation server 516 determining a malicious element in the webpage and further based on determining that a risk score associated with the webpage is high (e.g., because the webpage is associated with a wire transfer service). The validation server 516 may determine the backend service server 520 and/or the web server 508 to which the notification(s) are to be sent based on the webpage URL (and/or any other information sent by the user device 504).

A backend services server 520 may correspond to a server for providing online banking services to users. For example, the web server 508 may correspond to banking or a financial institution that may present a webpage, at the user device 504, for facilitating online banking. Based on user input via the webpage, the user device 504 may send a notification for processing various online banking services (e.g., account management, money transfer, bill payment, etc.). The validation server 516 may send notification(s) to the backend services server 520 and/or the web server 508 based on the validation server 516 determining a malicious element in the webpage and further based on determining that a risk score associated with the webpage is high (e.g., because a user of the user device has a high account balance/is a high value client). The validation server 516 may determine the backend service server 520 and/or the web server 508 to which the notification(s) are to be sent based on the webpage URL (and/or any other information sent by the user device 504).

A backend service server 520 may correspond to a card payment processor that may process an online payment (e.g., for an online purchase). For example, the web server 508 may correspond to online shopping portal that may present a webpage, at the user device 504, for processing a credit card payment. Based on user input via the webpage, the web server 508 may send a notification for processing the credit card payment to the backend services server 520. The validation server 516 may send a notification to the backend services server 520 based on the validation server 516 determining a malicious element in the webpage and further based on determining that the webpage is for processing a credit card payment (e.g., based on a URL of the webpage, or text included in the webpage).

The enterprise computing device 524 may be used for monitoring detection of malicious elements across multiple user devices. The validation server 516 may track detection of malicious elements over time and send notifications to the enterprise computing device 524 based on the tracking. For example, the enterprise computing device 524 may send statistics associated with detection of malicious elements in a webpage. The statistics may indicate a quantity of connections between user devices and a web server 508 that have been detected to be potentially compromised by malicious elements in a particular time interval.

At step 552, the web server 508 may terminate a connection between the user device 504 and the web server 508 based on receiving a notification from the validation server 516. As described above, the notification may include an IP address of the user device 504, username associated with a user of the user device 504, and/or information associated with a web connection between the user device 504 and the web server 508 (e.g., a session ID). Based on the received notification and further based on the IP address/username/session ID, the web server 508 may determine the user device 504 and terminate a connection with the user device 504.

At step 556, the backend services server 520 may block requests from the web server 508 and/or the user device 504 based on receiving a notification from the validation server 516. In an example where the backend services server 520 corresponds to a wire transfer service, the backend services server 520 may reject requests for wire transfers received from the user device 504. The backend services server 520 may determine the user device 504 based on an IP address of the user device 504, a session ID associated with the user, and/or a username associated with a user of the user device 504. The backend services server 520 may determine the web server 508 based on a webpage URL.

The backend services server 520 may use other criteria to determine whether requests from the web server 508 and/or the user device 504 are to be blocked based on receiving a notification from the validation server 516. For example, if the backend services server 520 corresponds to a wire transfer or an account transfer service, the backend services server 520 may determine to block or allow transfer requests from the user device 504 based on a transfer value. If a transfer value is greater than a threshold or a ratio of the transfer value to an account balance of the user is greater than a threshold, the backend services server 520 may block a transfer request from the user device 504/web server 508. If a transfer value is lower than a threshold or a ratio of the transfer value to an account balance of the user is lower than a threshold, the backend services server 520 may allow a transfer request from the user device 504/web server 508.

At step 560, if a hash value of an element is determined to be indeterminate, the validation server 516 may send a notification to the user device 504. The notification may indicate the element and may request the user device 504 to send the element to the validation server 516. Alternatively, the validation server 516 may request the user device 504 to send all elements of the DOM associated with the webpage.

At step 564, the user device 504 may send the requested element (or all elements of the DOM) to the validation server 516 and/or the enterprise user computing device 524. Sending the requested element or all the elements of the DOM may comprise compressing the elements prior to sending the elements to the validation server 516 and/or the enterprise user computing device 524. An enterprise user associated with the enterprise user computing device 524 may manually analyze the elements to determine whether they may be malicious. If an element is determined to be malicious it may be added to the hash repository at the validation server 516.

The validation server 516 may use other techniques for detecting MITM attacks that target multi-factor authentication. An attack device associated with a malicious actor may have a different profile (e.g., screen resolution settings, language settings, time zone settings, etc.) than that of legitimate user. The validation server 516 may log the user profile when the user inputs a first set of credentials (e.g., username, password). For example, the web server 508 may receive, from the user device 504, the user profile and send the user profile to the validation server 516. As described with reference to FIG. 1, the malware may cause presentation of a fake webpage, mimicking an authentic webpage, prompting the user to input an OTP. The OTP may be received by the attack device and sent to the web server 508. The web server 508 may determine a profile of the attack device when it receives the OTP, and send the user profile to the validation server 516. The validation server 516 may determine that a profile of the user device 504 is different from that of the attack device and send one or more notifications to the web server 508 and/or the backend services server(s) 520 (e.g., as described with respect to step 548). The web server 508 and/or the backend services server(s) 520 may perform one or more actions as described with reference to steps 552 and 556 (e.g., terminate a connection, block requests, etc.).

Figure 6:
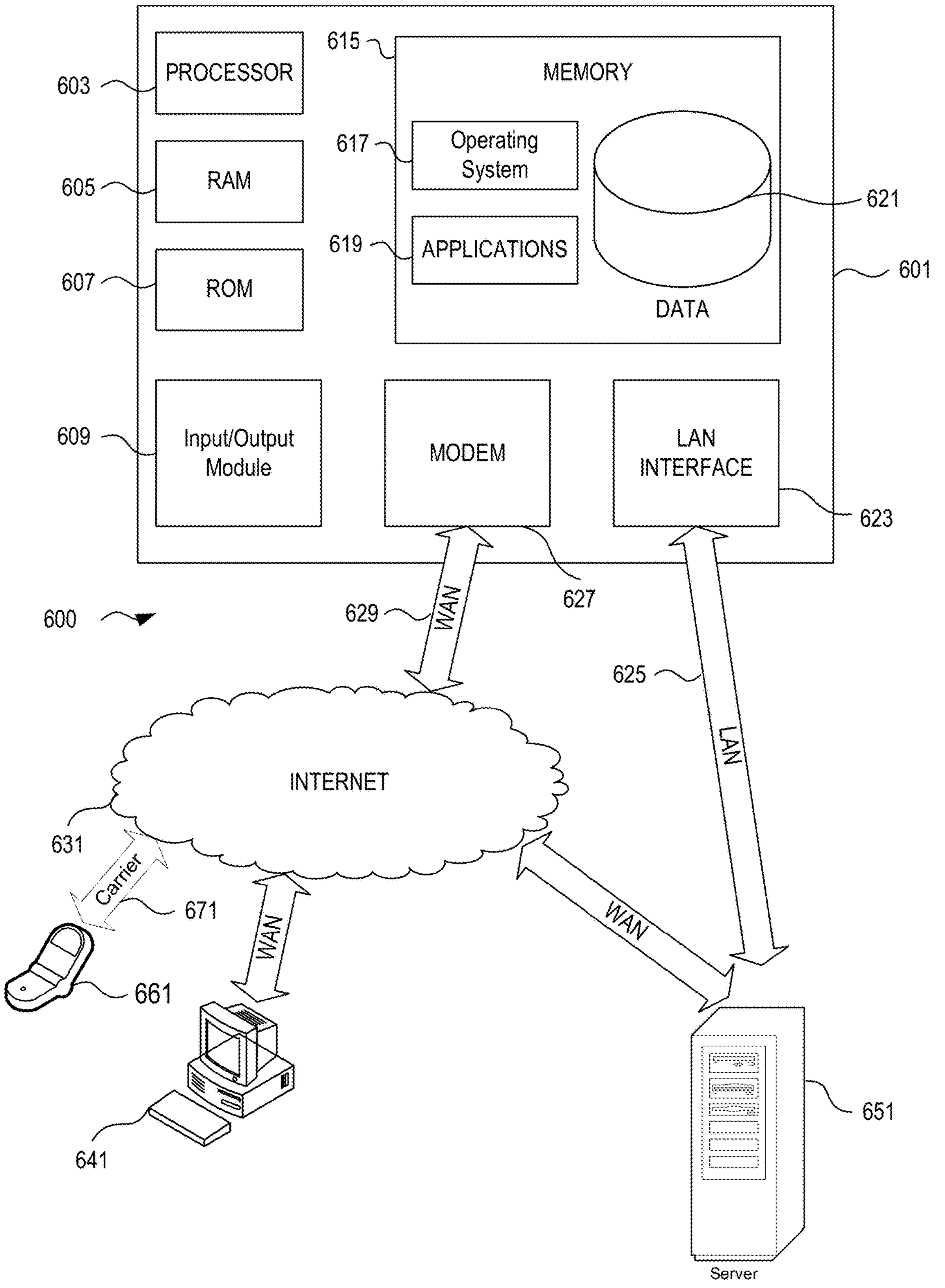
FIG. 6 shows an example of a computing system environment that may be used, in accordance with one or more aspects described herein.

FIG. 6 shows an example of a computing system environment 600 that may be used according to one or more illustrative embodiments. The computing system environment 600 is only one example of a suitable computing environment and is not intended to suggest any limitation as to the scope of use or functionality contained in the disclosure. The computing system environment 600 should not be interpreted as having any dependency or requirement relating to any one or combination of components shown in the computing system environment 600.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 6, the computing system environment 600 may include a computing device 601 wherein the processes discussed herein may be implemented. The computing device 601 may be, for example, the validation server 516. The computing device 601 may have a processor 603 for controlling overall operation of the computing device 601 and its associated components, including random-access memory (RAM) 605, read-only memory (ROM) 607, input/output module or communications module 609, and memory 615. Computing device 601 typically includes a variety of computer readable media. Computer readable media may be any available media that may be accessed by computing device 601 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 601.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 605 may include one or more applications representing the application data stored in RAM 605, while the computing device is on and corresponding software applications (e.g., software tasks) are running on the computing device 601. Communications module 609 may include a microphone, keypad, touch screen, and/or stylus through which a user of computing device 601 may provide input, and may also include one or more of a speaker for providing audio output and a video display device for providing textual, audiovisual and/or graphical output.

Software may be stored within memory 615 and/or storage to provide instructions to processor 603 for enabling computing device 601 to perform various functions. For example, memory 615 may store software used by the computing device 601, such as an operating system 617, application programs 619, and an associated database 621. Also, some or all of the computer executable instructions for computing device 601 may be embodied in hardware or firmware.

Computing device 601 may operate in a networked environment supporting connections to one or more remote computing devices, such as computing devices 641, 651, and 661. The computing devices 641, 651, and 661 may be personal computing devices or servers that include many or all of the elements described above relative to the computing device 601. For example, the computing device 651 may be a backend services server 520. Computing device 661 may be a mobile device communicating over wireless carrier channel 671. Computing devices 641 or the computing device 661 may be the user device 504.

The network connections depicted in FIG. 6 include a local area network (LAN) 625 and a wide area network (WAN) 629, but may also include other networks. When used in a LAN networking environment, computing device 601 may be connected to the LAN 625 through a network interface, such as LAN interface 623, or to an adapter in the communications module 609. When used in a WAN networking environment, the computing device 601 may include a modem in the communications module 609, a modem separate from the communications module 609, such as modem 627, or other means for establishing communications over the WAN 629, such as the Internet 631 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve webpages from a web-based server. Any of various conventional web browsers can be used to display and manipulate data on webpages.

Additionally, one or more application programs 619 used by the computing device 601, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 601. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 601. Such a processor may execute computer-executable instructions stored on a computer-readable medium.

Figure 7:
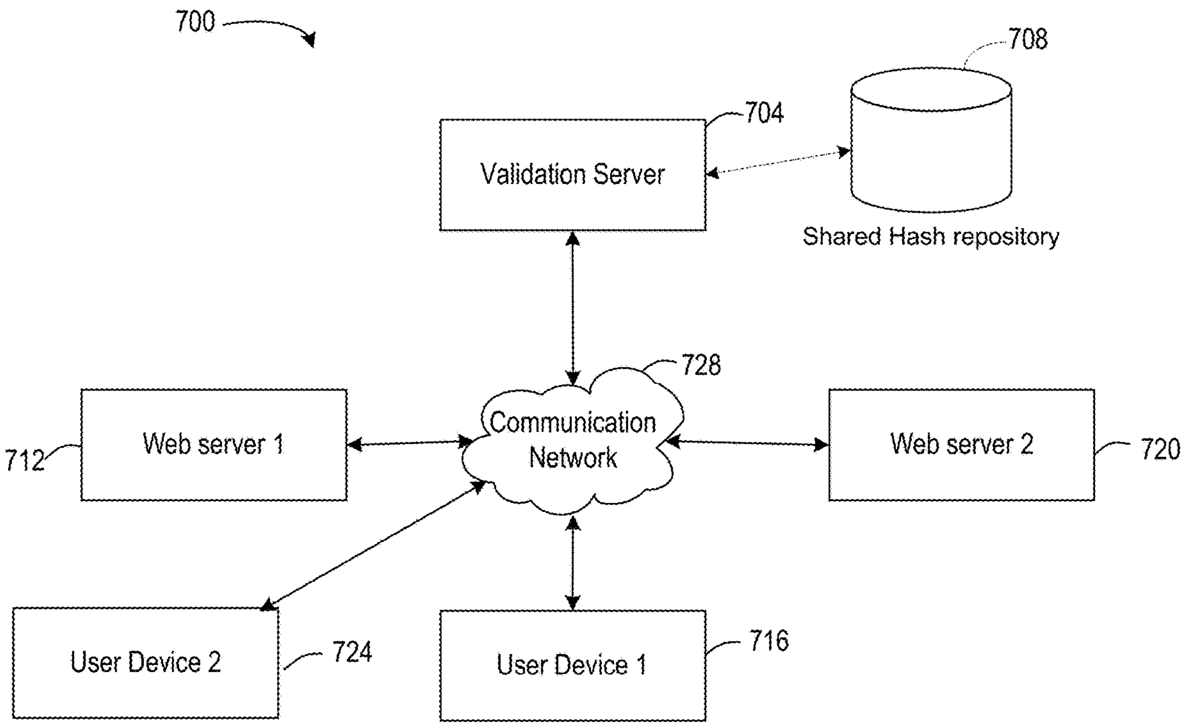
FIG. 7 shows an example communication architecture for hash validation across different servers, in accordance with one or more aspects described herein.

A validation server and a hash repository (e.g., comprising hashes corresponding to trusted elements of DOMs of webpages, and/or hashes corresponding to malicious elements as may be inserted by malware) may be shared across servers corresponding to multiple enterprise organizations providing different services. FIG. 7 shows an example communication architecture 700 for hash validation across multiple servers. A validation server 704 may be associated with a hash repository 708 that may be used to analyze hashes from user devices accessing services via web servers associated with different enterprise organizations. For example, web server 1 712 and web server 2 720 may correspond to different enterprise organizations. The web server 1 712 and/or web server 2 720 may embed in HTML documents, provided to user device 1 716 or user device 2 724, an element (e.g., comprising a <script> tag) indicating a URL for a client-side script file (e.g., a hashing script file). Based on the hashing script file, the user device 1 716 or the user device 2 724 may generate hash values for elements in webpages, provided by the web server 1 712 or the web server 720. The user device 1 716 or the user device 2 724 may send the generated hash values to the validation server 704 for analysis.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein describe threat detection using a validation server and based on hash analysis. Using the validation server may ensure reduced resource utilization at a user device and use of updated hash databases. Further, hash analysis may ensure that an entire element of a DOM need not necessarily be sent for analysis. The validation server (and/or other servers) may be configured to implement countermeasures based on risks associated with a particular user/webpage, enabling prioritization of more urgent/significant threats.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A system comprising:

a web server configured to send a webpage document;

a validation server; and a user device comprising:

at least one first processor; and memory storing first computer-readable instructions that, when executed by the at least one first processor, cause the user device to:

receive, from the web server, the webpage document;

send, to the web server, an indication of user credentials associated with the webpage document;

determine a first user profile comprising at least one of a screen resolution setting associated with the user device, a language setting associated with the user device, or a time zone setting associated with the user device; and send, to the validation server, an indication of the first user profile, wherein the sending the indication of the first user profile comprises sending the indication of the first user profile when the user credentials are being input at the user device;

wherein the validation server comprises:

at least one second processor; and memory storing second computer-readable instructions that, when executed by the at least one second processor, cause the validation server to:

after receiving the indication of the first user profile, receive, from a computing device that is different from the user device, an indication of a one-time passcode (OTP), wherein the receiving the indication of the OTP comprises receiving an indication of a second user profile, wherein the second user profile comprises at least one of a screen resolution setting associated with the computing device, a language setting associated with the computing device, or a time zone setting associated with the computing device; and based on determining that the second user profile is different from the first user profile, send one or more notifications to one or more other computing devices.

2. The system of claim 1, wherein the webpage document comprises a script element indicating a client-side script, and wherein the first computer-readable instructions, when executed by the at least one first processor, cause the user device to:

retrieve, based on the script element and from the validation server, the client-side script; and determine the first user profile by causing determining the first user profile based on executing the client-side script.

3. The system of claim 2, wherein the script element comprises a uniform resource locator (URL) corresponding to the client-side script, and wherein the first computer-readable instructions, when executed by the at least one first processor, cause the user device to retrieve the client-side script based on the URL.

4. The system of claim 2, wherein the first computer-readable instructions, when executed by the at least one first processor, cause the user device to:

generate, by the client-side script, for each element of a plurality of hypertext markup language (HTML) elements of the webpage document, a corresponding hash value; and send, to the validation server, hash values corresponding to the plurality of HTML elements.

5. The system of claim 4, wherein the second computer-readable instructions, when executed by the at least one second processor, cause the validation server to send the one or more notifications based on the hash values.

6. The system of claim 1, wherein the first computer-readable instructions, when executed by the at least one first processor, cause the user device to send, to the validation server, additional information, wherein the additional information comprises one of:

a session indicator (ID) associated with a web session between the user device and the web server;

a uniform resource locator (URL) associated with a webpage corresponding to the webpage document;

an internet protocol (IP) address associated with the user device;

a username, associated with the webpage, of a user of the user device;

text included in the webpage; and combinations thereof.

7. The system of claim 6, wherein the second computer-readable instructions, when executed by the at least one second processor, cause the validation server to determine, based on the additional information, a risk score associated with the webpage.

8. The system of claim 1, wherein the one or more other computing devices comprise the web server.

9. The system of claim 1, wherein based on receiving a notification, of the one or more notifications, the web server terminates a web session with to the user device.

10. A method comprising:

receiving, from a first computing device:

an indication of user credentials associated with a webpage document, and an indication of a first user profile, wherein the first user profile comprises at least one of a screen resolution setting associated with the first computing device, a language setting associated with the first computing device, or a time zone setting associated with the first computing device;

after receiving the indications of the user credentials and the first user profile, receiving, from a second computing device that is different from the first computing device:

an indication of a one-time passcode (OTP), and an indication of a second user profile, wherein the second user profile comprises at least one of a screen resolution setting associated with the second computing device, a language setting associated with the second computing device, or a time zone setting associated with the second computing device; and based on determining that the second user profile is different from the first user profile, sending one or more notifications to one or more other computing devices.

11. The method of claim 10, further comprising:

receiving, for each element of a plurality of hypertext markup language (HTML) elements of the webpage document, a corresponding hash value.

12. The method of claim 11, wherein the sending the one or more notifications comprises sending the one or more notifications based on received hash values.

13. The method of claim 10, further comprising receiving, from the first computing device, additional information, wherein the additional information comprises one of:

a session indicator (ID) associated with a web session between the first computing device and a web server;

a uniform resource locator (URL) associated with a webpage corresponding to the webpage document;

an internet protocol (IP) address associated with the first computing device;

a username, associated with the webpage, of a user of the first computing device;

text included in the webpage; and combinations thereof.

14. The method of claim 13, further comprising determining, based on the additional information, a risk score associated with the webpage.

15. The method of claim 10, wherein the one or more other computing devices comprise a web server associated with the webpage document.

16. A validation server comprising:

at least one processor;

a communication interface communicatively coupled to the at least one processor; and memory storing computer-readable instructions that, when executed by the at least one processor, cause the validation server to:

receive, from a first computing device:

an indication of user credentials associated with a webpage document, and an indication of a first user profile, wherein the first user profile comprises at least one of a screen resolution setting associated with the first computing device, a language setting associated with the first computing device, or a time zone setting associated with the first computing device;

after receiving the indications of the user credentials and the first user profile, receive, from a second computing device that is different from the first computing device:

an indication of a one-time passcode (OTP), and an indication of a second user profile, wherein the second user profile comprises at least one of a screen resolution setting associated with the second computing device, a language setting associated with the second computing device, or a time zone setting associated with the second computing device; and based on determining that the second user profile is different from the first user profile, send one or more notifications to one or more other computing devices.

17. The validation server of claim 16, wherein the instructions, when executed by the at least one processor, cause the validation server to:

receive, for each element of a plurality of hypertext markup language (HTML) elements of the webpage document, a corresponding hash value.

18. The validation server of claim 17, wherein the instructions, when executed by the at least one processor, cause the validation server to send the one or more notifications by causing sending the one or more notifications based on received hash values.

19. The validation server of claim 16, wherein the one or more other computing devices comprise a web server associated with the webpage document.

20. The validation server of claim 19, wherein the one or more notifications cause the web server to terminate a web session with the first computing device.

* * * * *